US012722609B1

(12) United States Patent
Antanaitis et al.

(10) Patent No.: US 12,722,609 B1
(45) Date of Patent: Sep. 1, 2026

(54) INITIALIZING AND ACTIVELY ADJUSTING BRAKE FORCE DISTRIBUTION TO OPTIMIZE BRAKE WEAR AND PERFORMANCE

(71) Applicant: GM Global Technology Operations LLC, Detroit, MI (US)

(72) Inventors: David B. Antanaitis, Northville, MI (US); Samuel Steele, Ypsilanti, MI (US); Edward Thomas Heil, Howell, MI (US); Christopher R. Wilson, Farmington Hills, MI (US); Ryan R. Loveland, Rochester, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 4 days.

(21) Appl. No.: 19/097,271

(22) Filed: Apr. 1, 2025

(51) Int. Cl.

| | |
|---|---|
| ***B60T 8/26*** | (2006.01) |
| ***B60T 8/171*** | (2006.01) |
| ***B60T 8/172*** | (2006.01) |
| ***B60T 17/22*** | (2006.01) |

(52) U.S. Cl.
CPC .............. *B60T 8/266* (2013.01); *B60T 8/171* (2013.01); *B60T 8/172* (2013.01); *B60T 17/221* (2013.01); *B60T 2270/406* (2013.01)

(58) Field of Classification Search
CPC .......... B60T 8/266; B60T 8/171; B60T 8/172; B60T 17/221; B60T 2270/406
USPC ........................................................... 701/70
See application file for complete search history.

(56) References Cited

U.S. PATENT DOCUMENTS

2024/0416878 A1 12/2024 Larson et al.
2025/0368050 A1* 12/2025 Matsuyama .............. B60L 3/12

* cited by examiner

*Primary Examiner* — Yi-Kai Wang
(74) *Attorney, Agent, or Firm* — Vivacqua Crane, PLLC

(57) ABSTRACT

A system for initializing and actively adjusting brake force distribution (BFD) in a host vehicle includes sensors, actuators, and a controller that executes program code portions including a BFD application. The BFD application performs an off-line optimization of BFD, computes real-time wear of brake components, performs brake component wear checks, performs a mileage interval adjustment of BFD based on real-time wear of the brake components and the off-line optimization of the BFD, selectively engages an auto-trim mode of the BFD application, and selectively engages a manual trim mode of the BFD application. The BFD application adjusts the BFD of the host vehicle to automatically compensate for brake wear imbalances front-to-rear and side-to-side, thereby delaying brake service intervals, causing brake components to have a lengthened service life, and maintaining and improving host vehicle braking performance.

20 Claims, 3 Drawing Sheets

10,52
100
102
104
106
108
110
112
114
116
118
120
122
124
126
128
32
Y
N

INITIALIZING AND ACTIVELY ADJUSTING BRAKE FORCE DISTRIBUTION TO OPTIMIZE BRAKE WEAR AND PERFORMANCE

INTRODUCTION

The present disclosure relates to systems and method for managing vehicle performance, and more specifically to systems and methods for actively controlling braking performance of vehicles. Braking systems often have a fixed brake force distribution side-to-side and front-to-rear. While such systems may be minimally adjusted by modulating control valves in the system, such adjustments are typically not carried out dynamically.

While current systems and methods for managing brake force distribution in vehicles operate for their intended purpose, there is a need in the art for systems and methods for initializing and actively adjusting brake force distribution that optimize brake component wear and performance, dynamically adjust brake force distribution front-to-rear and side-to-side during vehicle operation to optimize brake component wear for a vehicle operator's usage pattern, and which provide for manual adjustment of brake force distribution based on vehicle operator preferences during certain driving conditions, while maintaining or decreasing system complexity, improving reliability, and improving system reliability and redundancy.

SUMMARY

According to several aspects of the present disclosure, a system for initializing and actively adjusting brake force distribution (BFD) in a host vehicle includes a host vehicle, one or more sensors and one or more actuators. Each of the one or more sensors and one or more actuators is integrated into the host vehicle. The one or more sensors detect static and dynamic state information about the host vehicle. The one or more actuators alter the static and dynamic state of the host vehicle. The system further includes a controller having a processor, a memory, and input/output (I/O) ports. The I/O ports are in communication with the one or more sensors and the one or more actuators. The processor executes program code portions stored in the memory. The program code portions include a brake force distribution (BFD) application having at least first, second, third, fourth, fifth, and sixth control logics. The first control logic performs an off-line optimization of BFD. The second control logic computes real-time wear of brake components. The third control logic performs brake component wear checks. The fourth control logic performs a mileage interval adjustment of BFD based on real-time wear of the brake components and the off-line optimization of the BFD. The fifth control logic selectively engages an auto-trim mode of the BFD application. The sixth control logic selectively engages a manual trim mode of the BFD application. The BFD application adjusts the BFD of the host vehicle to automatically compensate for brake wear imbalances front-to-rear and side-to-side of the host vehicle, thereby delaying brake service intervals, causing brake components to have a lengthened service life, and maintaining and improving host vehicle braking performance.

In another aspect of the present disclosure the first control logic further includes: control logic that determines an optimized or idealized BFD for the host vehicle. The optimized or idealized BFD defines an initial calibration for BFD across the one or more actuators of a braking system of the host vehicle. The optimized or idealized BFD respects predetermined boundaries, including predetermined drivability boundaries and predetermined test procedures.

In yet another aspect of the present disclosure the second control logic further includes: control logic for obtaining, from the one or more sensors, brake component wear information; and control logic for modeling brake component wear though a detailed model of the braking system, including predefined and adaptable front and rear brake thermal cooling performance expectations, front and rear brake component wear characteristics, and road load losses.

In yet another aspect of the present disclosure the third control logic further includes: control logic for performing brake component wear checks based on calibrated time intervals and calibrated host vehicle mileage. The calibrated time intervals further include at least one of a predetermined time interval and an adjustable time interval. The calibrated mileage intervals further include at least one of a predetermined host vehicle mileage interval and an adjustable host vehicle mileage interval.

In yet another aspect of the present disclosure the third control logic further includes: control logic for detecting a brake component wear imbalance, including comparing a normalized wear to a calibratable threshold wear, and upon determining that the normalized wear is greater than the calibratable threshold wear, initializing a diagnostic process that informs a host vehicle operator of the brake component wear imbalance through one or more of a visual, audible, and haptic feedback presented through a human-machine interface (HMI) of the host vehicle.

In yet another aspect of the present disclosure the fourth control logic further includes: control logic for determining that measured or computed brake component wear rates indicate a severe duty cycle of usage, and that brake component wear rates are elevated above predetermined normal or standard wear rates. The fourth control logic further includes control logic that increases a frequency of brake component wear checks above a predetermined frequency of brake component wear checks; and control logic that increases a frequency of BFD trim adjustments above a predetermined frequency of BFD trim adjustments.

In yet another aspect of the present disclosure the fifth control logic further includes: control logic that, within the auto-trim mode, determines that a brake request is below a calibrated threshold, and upon determining that the brake request is below the calibrated threshold, trims BFD to compensate for wear imbalances. Upon determining that the brake request is not below the calibrated threshold, the fifth control logic blends BFD back to a baseline BFD.

In yet another aspect of the present disclosure the sixth control logic further includes: control logic that, within the manual trim mode, prompts the vehicle operator to make a manual BFD selection via one or more HMIs of the vehicle, including: manually selecting a front-to-rear BFD; and manually selecting a side-to-side BFD. Each of the front-to-rear and side-to-side BFDs are bounded by predefined drivability limits, avoid excessive yaw rates, and avoid path deviations during braking.

In yet another aspect of the present disclosure the sixth control logic further includes: control logic that, within the manual trim mode, prompts the vehicle operator to select from at least a static BFD and a dynamic BFD.

In yet another aspect of the present disclosure the static BFD further includes: control logic that, in the static BFD, causes the vehicle operator to select, within the HMI, a static BFD, including a static front-to-rear BFD and a static side-to-side BFD; and control logic that, in the dynamic BFD, causes the vehicle operator to select, within the HMI, a gain. The gain changes side-to-side BFD according to current host vehicle steering control directions. The sixth control further includes control logic that in either the static BFD or the dynamic BFD, causes the BFD to remain within predefined boundary conditions tied to at least one of: predetermined host vehicle use cases including race track, off road, and service/diagnostic uses.

In yet another aspect of the present disclosure a method for initializing and actively adjusting brake force distribution (BFD) in a host vehicle includes: detecting static and dynamic state information about the host vehicle with one or more sensors integrated into the host vehicle, and altering the static and dynamic state of the host vehicle with one or more actuators integrated into the host vehicle. The method further includes executing, with a processor of a controller, program code portion stored in memory of the controller, the controller further having one or more input/output (I/O) ports in communication with the one or more sensors and the one or more actuators. The program code portions include a brake force distribution (BFD) application comprising control logic for: performing an off-line optimization of BFD; computing real-time wear of brake components; performing brake component wear checks; performing a mileage interval adjustment of BFD based on the real-time wear of brake components and the off-line optimization of the BFD; selectively engaging an auto-trim mode of the BFD application; and selectively engaging a manual trim mode of the BFD application. The method further includes adjusting the BFD of the host vehicle to automatically compensate for brake wear imbalances front-to-rear and side-to-side of the host vehicle, thereby delaying brake service intervals, causing brake components to have a lengthened service life, and maintaining and improving host vehicle braking performance.

In yet another aspect of the present disclosure the method further includes determining an optimized or idealized BFD for the host vehicle. The optimized or idealized BFD defines an initial calibration for BFD across the one or more actuators of a braking system of the host vehicle. The optimized or idealized BFD respects predetermined boundaries, including predetermined drivability boundaries and predetermined test procedures.

In yet another aspect of the present disclosure the method further includes obtaining, from the one or more sensors, brake component wear information, and modeling brake component wear though a detailed model of the braking system, including predefined and adaptable front and rear brake thermal cooling performance expectations, front and rear brake component wear characteristics, and road load losses.

In yet another aspect of the present disclosure the method further includes performing brake component wear checks based on calibrated time intervals and calibrated host vehicle mileage. The calibrated time intervals further include at least one of a predetermined time interval and an adjustable time interval; and the calibrated mileage intervals further include at least one of a predetermined host vehicle mileage interval and an adjustable host vehicle mileage interval.

In yet another aspect of the present disclosure the method further includes detecting a brake component wear imbalance, including comparing a normalized wear to a calibratable threshold wear, and upon determining that the normalized wear is greater than the calibratable threshold wear, initializing a diagnostic process that informs a host vehicle operator of the brake component wear imbalance through one or more of a visual, audible, and haptic feedback presented through a human-machine interface (HMI) of the host vehicle.

In yet another aspect of the present disclosure the method further includes determining that measured or computed brake component wear rates indicate a severe duty cycle of usage, and that brake component wear rates are elevated above predetermined normal or standard wear rates; and increasing a frequency of brake component wear checks above a predetermined frequency of brake component wear checks; and increasing a frequency of BFD trim adjustments above a predetermined frequency of BFD trim adjustments.

In yet another aspect of the present disclosure the method further includes determining, within the auto-trim mode, that a brake request is below a calibrated threshold, and upon determining that the brake request is below the calibrated threshold, trimming the BFD to compensate for wear imbalances; and upon determining that the brake request is not below the calibrated threshold, blends BFD back to a baseline BFD.

In yet another aspect of the present disclosure the method further includes prompting, within the manual trim mode, the vehicle operator to make a manual BFD selection via one or more HMIs of the vehicle, including: manually selecting a front-to-rear BFD; and manually selecting a side-to-side BFD, wherein each of the front-to-rear and side-to-side BFDs are bounded by predefined drivability limits, avoid excessive yaw rates, and avoid path deviations during braking.

In yet another aspect of the present disclosure the method further includes prompting, within the manual trim mode, the vehicle operator to select from at least a static BFD and a dynamic BFD, and causing, in the static BFD, the vehicle operator to select a static BFD, including a static front-to-rear BFD and a static side-to-side BFD. The method further includes causing, in the dynamic BFD, the vehicle operator to select a gain, wherein the gain changes side-to-side BFD according to current host vehicle steering control directions; and causing, in either the static BFD or the dynamic BFD, the BFD to remain within predefined boundary conditions tied to at least one of: predetermined host vehicle use cases including race track, off road, and service/diagnostic uses.

In yet another aspect of the present disclosure a method for initializing and actively adjusting brake force distribution (BFD) in a host vehicle includes: detecting static and dynamic state information about the host vehicle with one or more sensors integrated into the host vehicle, the one or more sensors; and altering the static and dynamic state of the host vehicle with one or more actuators integrated into the host vehicle. The method further includes executing, with a processor of a controller, program code portion stored in memory of the controller, the controller further having one or more input/output (I/O) ports in communication with the one or more sensors and the one or more actuators. The program code portions including a brake force distribution (BFD) application comprising control logic for: performing an off-line optimization of BFD, including: determining an optimized or idealized BFD for the host vehicle. The optimized or idealized BFD defines an initial calibration for BFD across the one or more actuators of a braking system of the host vehicle, wherein the optimized or idealized BFD respects predetermined boundaries, including predetermined drivability boundaries and predetermined test procedures. The BFD application further includes control logic for: computing real-time wear of brake components, including: obtaining, from the one or more sensors, brake component wear information; and modeling brake component wear though a detailed model of the braking system, including predefined and adaptable front and rear brake thermal cooling performance expectations, front and rear brake component wear characteristics, and road load losses. The BFD application further includes control logic for: performing brake component wear checks, including: performing brake component wear checks based on calibrated time intervals and calibrated host vehicle mileage. The calibrated time intervals further include at least one of a predetermined time interval and an adjustable time interval; and the calibrated mileage intervals further include at least one of a predetermined host vehicle mileage interval and an adjustable host vehicle mileage interval. The BFD application further includes control logic for: detecting a brake component wear imbalance, including comparing a normalized wear to a calibratable threshold wear, and upon determining that the normalized wear is greater than the calibratable threshold wear, initializing a diagnostic process that informs a host vehicle operator of the brake component wear imbalance through one or more of a visual, audible, and haptic feedback presented through a human-machine interface (HMI) of the host vehicle. The BFD application further includes control logic for: performing a mileage interval adjustment of BFD, including: determining that measured or computed brake component wear rates indicate a severe duty cycle of usage, and that brake component wear rates are elevated above predetermined normal or standard wear rates; and increasing a frequency of brake component wear checks above a predetermined frequency of brake component wear checks; and increasing a frequency of BFD trim adjustments above a predetermined frequency of BFD trim adjustments. The BFD application further includes control logic for: selectively engaging an auto-trim mode of the BFD application, including: determining, within the auto-trim mode, that a brake request is below a calibrated threshold, and upon determining that the brake request is below the calibrated threshold, trimming the BFD to compensate for wear imbalances; and upon determining that the brake request is not below the calibrated threshold, blends BFD back to a baseline BFD. The BFD application further includes control logic for: selectively engaging a manual trim mode of the BFD application, including: prompting, within the manual trim mode, the vehicle operator to make a manual BFD selection via one or more HMIs of the vehicle, including: manually selecting a front-to-rear BFD; and manually selecting a side-to-side BFD. Each of the front-to-rear and side-to-side BFDs are bounded by predefined drivability limits, avoid excessive yaw rates, and avoid path deviations during braking; prompting, within the manual trim mode, the vehicle operator to select from at least a static BFD and a dynamic BFD; causing, in the static BFD, the vehicle operator to select a static BFD, including a static front-to-rear BFD and a static side-to-side BFD; causing, in the dynamic BFD, the vehicle operator to select a gain. The gain changes side-to-side BFD according to current host vehicle steering control directions. The BFD application further includes control logic for: causing, in either the static BFD or the dynamic BFD, the BFD to remain within predefined boundary conditions tied to at least one of: predetermined host vehicle use cases including race track, off road, and service/diagnostic uses; and adjusting the BFD of the host vehicle to automatically compensate for brake wear imbalances front-to-rear and side-to-side of the host vehicle, thereby delaying brake service intervals, causing brake components to have a lengthened service life, and maintaining or improving host vehicle braking performance.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
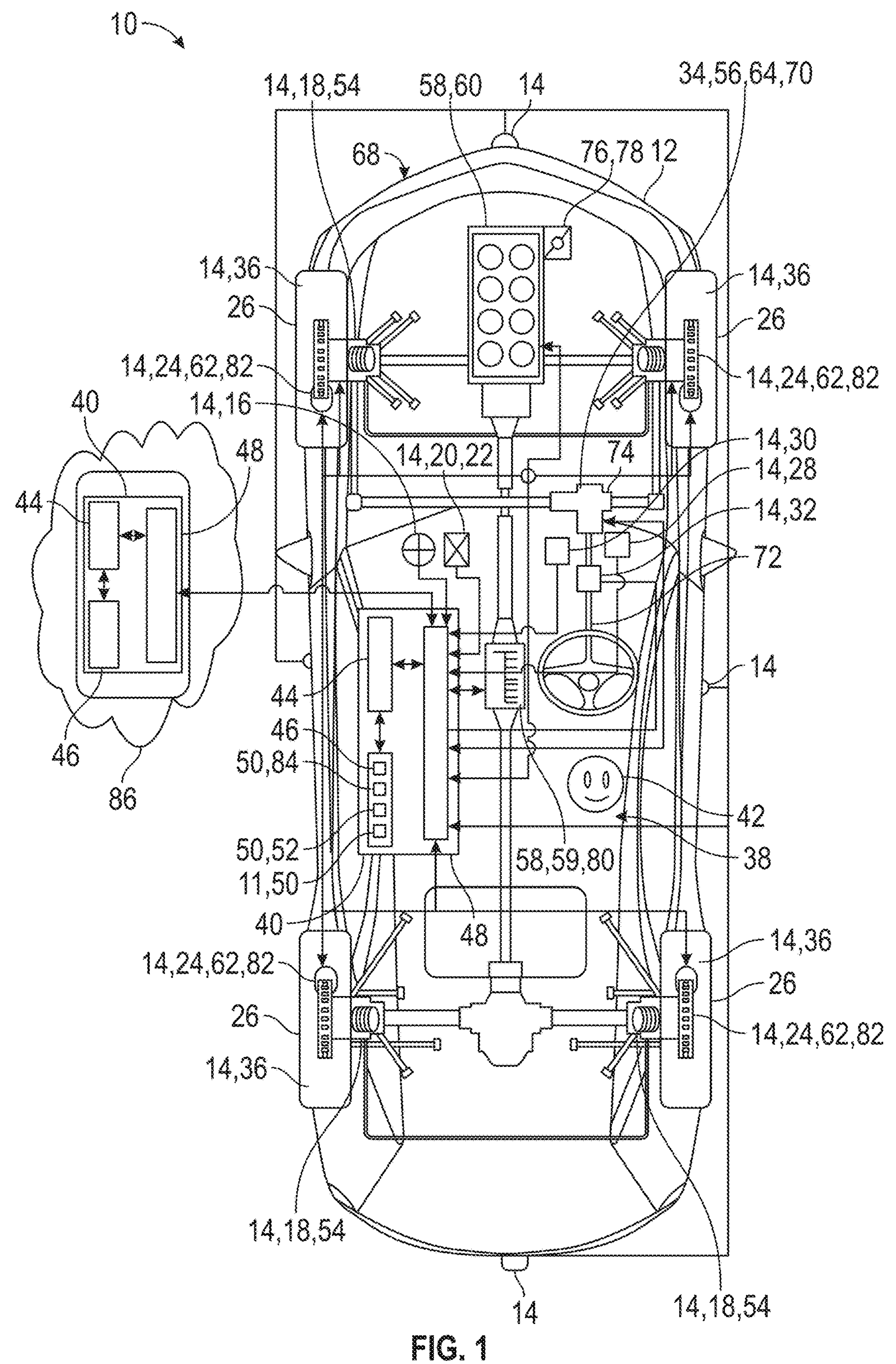
FIG. 1 is a schematic view of a system for initializing and actively adjusting brake force distribution to optimize brake wear and performance according to an exemplary embodiment.

Referring to FIG. 1, a system 10 for maneuver prediction-based speed profile adaptation for behavior-based automated cruise control (ACC) 11 is shown. The system 10 includes a vehicle 12. The host vehicle 12 is illustrated as a passenger vehicle, however, it should be appreciated that the host vehicle 12 may be any type of vehicle, including but not limited to: cars, trucks, sport utility vehicles (SUVs), vans, motor homes, semis, tractor-trailers, delivery vehicles including vehicles used within warehouses, tricycles, motorcycles, planes, amphibious vehicles, or any other such vehicle 12. Additionally, the host vehicle 12 may be an aircraft, a watercraft, or the like without departing from the scope or intent of the present disclosure.

The system 10 further includes one or more sensors 14 disposed on, attached to, or otherwise integrated into the host vehicle 12. Additional sensors 14 may be located remotely from the host vehicle 12, and communicate information to the host vehicle 12 as will be described in further detail below. Sensors 14 of the host vehicle 12 may include any of a wide variety of sensor types, including but not limited to: electromagnetic (EM) sensors 14 such as cameras, infra-red cameras, video cameras, light detection and ranging (LiDAR) sensors, radio detection and ranging (RADAR) sensors, sound navigation and ranging (SONAR) sensors, and the like. In some examples, cameras and/or other sensors 14 of the host vehicle 12 are mounted with exterior fields of view (FOVs), and data collected by such cameras include optical information about an environment in which the host vehicle 12 is operating. In additional non-limiting examples, the cameras and/or other sensors 14 are directed towards an interior or passenger compartment of the host vehicle 12, thereby providing information about host vehicle 12 occupants and host vehicle 12 operators. Additional sensors 14 may include, without limitation: inertial measurement units (IMUs) 16, suspension control units such as Semi Active Damping Suspension (SADS) sensors 18, global positioning system (GPS) 20 sensors 22, wheel speed sensors 24 capable of measuring rotational speeds of one or more wheels 26 of the host vehicle 12, throttle and/or accelerator pedal position sensors 28, brake pedal position sensors 30, steering position sensors 32 capable of measuring a steering system 34 position, steering rate, and steering velocity, tire pressure monitoring systems 36, and the like.

The IMUs 16 can measure host vehicle 12 movement, acceleration, and the like in several degrees of freedom. In a specific example, the IMUs 16 may measure position, movement, acceleration, etc. in at least three degrees of freedom. Likewise, the SADS sensors 18 may be IMUs 16 capable of measuring in three or more degrees of freedom. In some examples, the SADS 18 may be suspension hub accelerometers, or the like. The sensors 14 of the host vehicle 12 may therefore detect and record wheel speed data, host vehicle 12 position and location, host vehicle 12 static and dynamic state information such as velocity, acceleration, and the like.

As used herein, the terms “forward”, “rear”, “inner”, “inwardly”, “outer”, “outwardly”, “above”, and “below” are terms used relative to the orientation of the host vehicle 12 as shown in the drawings of the present application. Thus, “forward” refers to a direction toward a front of a vehicle 12, “rearward” refers to a direction toward a rear of a vehicle 12, “inner” and 589 “inwardly” refers to a direction towards an interior or passenger compartment 38 of a vehicle 12, and “outer” and “outwardly” refers to a direction towards the exterior of a vehicle 12, “below” refers to a direction towards the bottom of the host vehicle 12, and “above” refers to a direction towards a top of the host vehicle 12.

The system 10 further includes one or more controllers 40 in communication with the various sensors 14 of the host vehicle 12, processes information received therefrom, and generates output signals that are used to assist the vehicle operator 42 in maintaining attention and avoiding highway hypnosis or white line fever. The controllers 40 are integrated into the host vehicle 12. More specifically, the controllers 40 are non-generalized, electronic control devices having a preprogrammed digital computer or processor 44, non-transitory computer readable medium or memory 46 used to store data such as control logic, software applications, instructions, computer code, data lookup tables, etc., and input/output (I/O) ports 48. Computer readable medium or memory 46 includes any type of medium capable of being accessed by a computer, such as read only memory (ROM), random access memory (RAM), a hard disk drive, a compact disk (CD), a digital video disc (DVD), or any other type of memory. A “non-transitory” computer readable memory 46 excludes wired, wireless, optical, or other communication links that transport transitory electrical or other signals. A non-transitory computer readable memory 46 includes media where data can be permanently stored, and media where data can be stored and later overwritten, such as a rewritable optical disc or an erasable memory device. Computer code includes any type of program code, including source code, object code, and executable code. The processor 44 is configured to execute the code or instructions. The host vehicle 12 may have additional controllers 40 such as a dedicated Wi-Fi controller, an engine control module, a transmission control module, a body control module, an infotainment control module, or the like. The I/O ports 48 may be configured to communicate via wired communications, wirelessly via Wi-Fi protocols under IEEE 802.11x, or the like without departing from the scope or intent of the present disclosure.

The controller 40 further includes one or more applications 50. An application 50 is a software program configured to perform a specific function or set of functions. The application 50 may include one or more computer programs, software components, sets of instructions, procedures, functions, objects, classes, instances, related data, or portions thereof adapted for implementation in a suitable computer readable program code. The applications 50 may be stored within the memory 46 or in additional or separate memory 46. Examples of applications 50 include audio or video streaming services, games, browsers, social media, etc. In other examples, the applications 50 are used to manage host vehicle 12 body control system functions; brake force distribution, suspension control system 54 functions; steering control system 56 functions; powertrain 58 control system functions, including transmission 59 and/or engine 60 control system functions; braking system 62 control functions; or the like in an exemplary host vehicle 12. More specifically, the host vehicle 12 is equipped with a variety of control systems that manage static and dynamic host vehicle 12 performance characteristics via a plurality of onboard actuators 64 equipped to the host vehicle 12.

The actuators 64 may take any of a variety of different forms, and manage many distinct and/or interrelated host vehicle 12 control systems without departing from the scope or intent of the present disclosure. It will be appreciated that the actuators 64 may be electrically, hydraulically, pneumatically, mechanically, electromechanically, electrohydraulically, electropneumatically, magnetorheologically, hydropneumatically, electromagnetically, and/or any combination of the above types of actuatable devices that are used to alter one or more static and/or dynamic performance attributes of the host vehicle 12.

In some non-limiting examples, the suspension control system 54 includes one or more suspension system actuators 64 such as active or semi-active dampers 66 capable of altering a damping force transmitted from wheels 26 of the host vehicle 12 to a body 68 of the host vehicle 12 as the host vehicle 12 is driven on a road surface. The steering control system 56 actuators may include electric motors, electrohydraulic, electropneumatic, or other such motors or steering actuators 70 that apply torque to a steering shaft 72 or steering rack 74 of the host vehicle 12, and which thereby alter a direction of host vehicle 12 travel by altering a position or angular orientation of steerable wheels 26 of the host vehicle 12. By contrast, the onboard actuators 64 of the transmission 59 or engine 60 control system may include the transmission 59 or engine 60 themselves and/or actuating components therein which may alter a torque output or torque ratio of the engine 60 or transmission 59 or the like. In some non-limiting transmission 59 or engine 60 control system actuators 76 may include a throttle or e-throttle 78 capable of altering a torque output of the engine 60, a transmission actuator 80 capable of altering gear ratios and torque-outputs transmitted from the engine 60 through the transmission 59, and the like. It should further be appreciated that while the host vehicle 12 shown in FIG. 1 is equipped with an internal combustion engine (ICE) 60, that the engine 60 may be any type of engine 60 or prime mover, such as an ICE engine 60, an electric motor, a hybrid-electric engine 60, combinations thereof, or any other type of known engine 60 type without departing from the scope or intent of the present disclosure. Similarly, the braking system 62 actuators 64 include brakes 82 of the host vehicle 12 capable of selectively retarding a rotational speed of the wheels 26 of the host vehicle 12, and thereby altering a velocity of the host vehicle 12 itself. It will be appreciated that the brakes 82 may include any of a variety of different types of brakes 82, including but not limited to: disk brakes having brake disks frictionally interacting with brake calipers, drum brakes having brake shoes frictionally interacting with brake drums, electronic braking systems including electric motors that may be electromagnetically rotated or impeded from rotating to slow wheels 26 of the host vehicle 12, and the like.

The host vehicle 12 may be operated in any one of a variety of different modes, including a fully manual mode, in which the vehicle operator 42 has full control of host vehicle 12 static and dynamic performance characteristics. In other non-limiting examples, the host vehicle 12 may be operated in fully or semi-autonomous modes that control some or all of the static and dynamic performance of the host vehicle 12. More specifically, the system 10 of the present disclosure operates on a host vehicle 12 having advanced driver assistance systems (ADAS) 84 capable of controlling automatic cruise control (ACC) 11 functions, steering, braking, and any of a variety of other means of controlling onboard host vehicle 12 systems.

In additional non-limiting examples, the braking systems 62 of the host vehicle 12 may include a variety of distinct and/or interrelated functions, such as brake force distribution (BFD) functions that can alter a quantity of brake force applied at each of the wheels 20 of the host vehicle 12. The braking system 62 may include one or more central actuators that utilize hydraulic pumps and/or manually-generated hydraulic pressure to manipulate a flow of brake fluid about the host vehicle 12 braking system 62 to different brakes 82 or brake corners. Control of the direction of brake fluid flow to each brake caliper may be effected through manual and/or electronic controls through a variety of valves, valve bodies, and the like. In additional non-limiting examples, each of the brakes 82 may be actuated independently, in tandem with other brakes 82, or the like via eletromechanical brake calipers. In such electromechanical examples, though not limited entirely thereto, the system 10 adaptively optimizes the BFD for particular use cases, such as for particular surfaces, particular track applications or other such high-performance or heavy duty-cycle applications.

Figure 2:
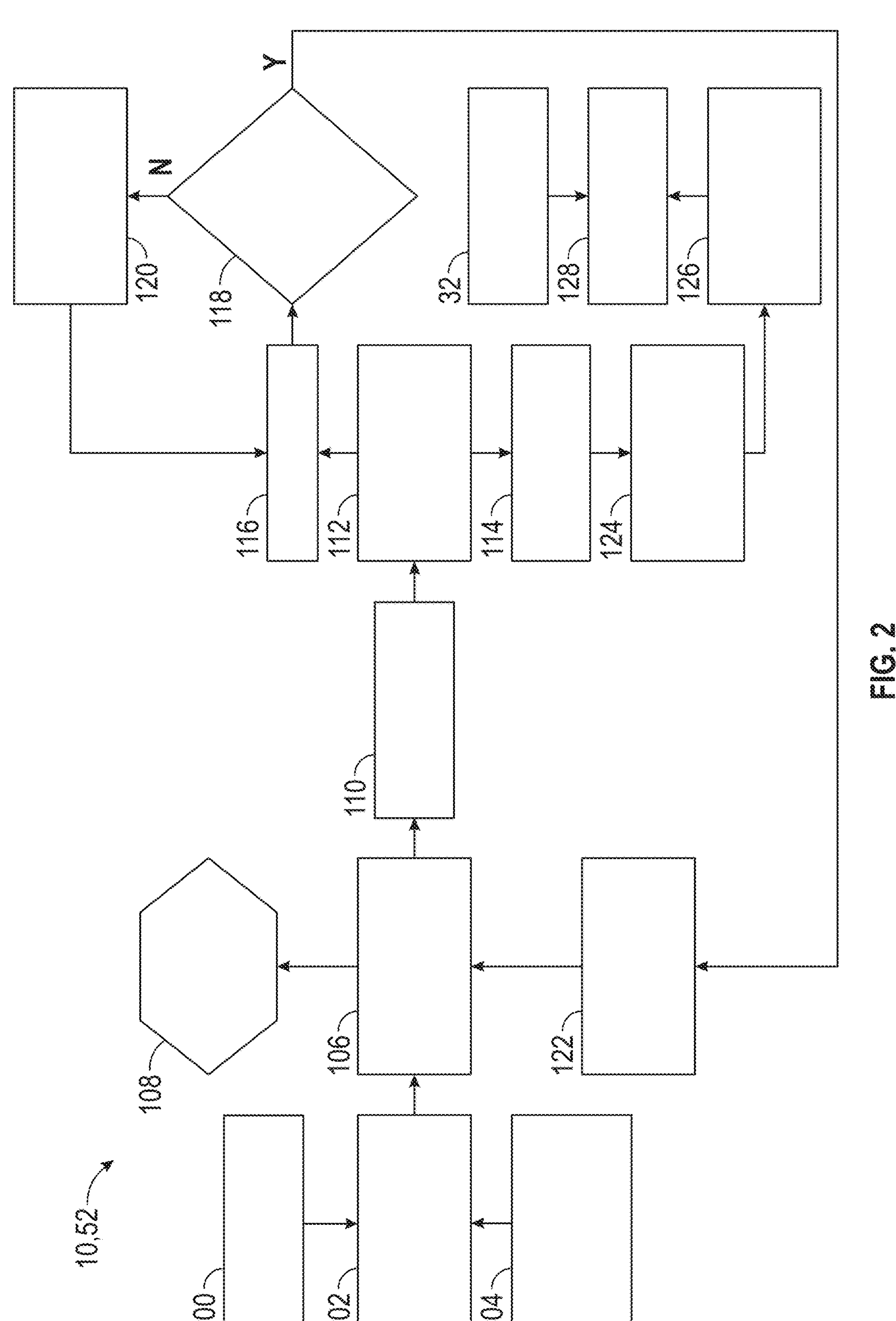
FIG. 2 is a flowchart depicting logical flow of a brake force distribution application of the system of FIG. 1 according to an exemplary embodiment.
Figure 3:
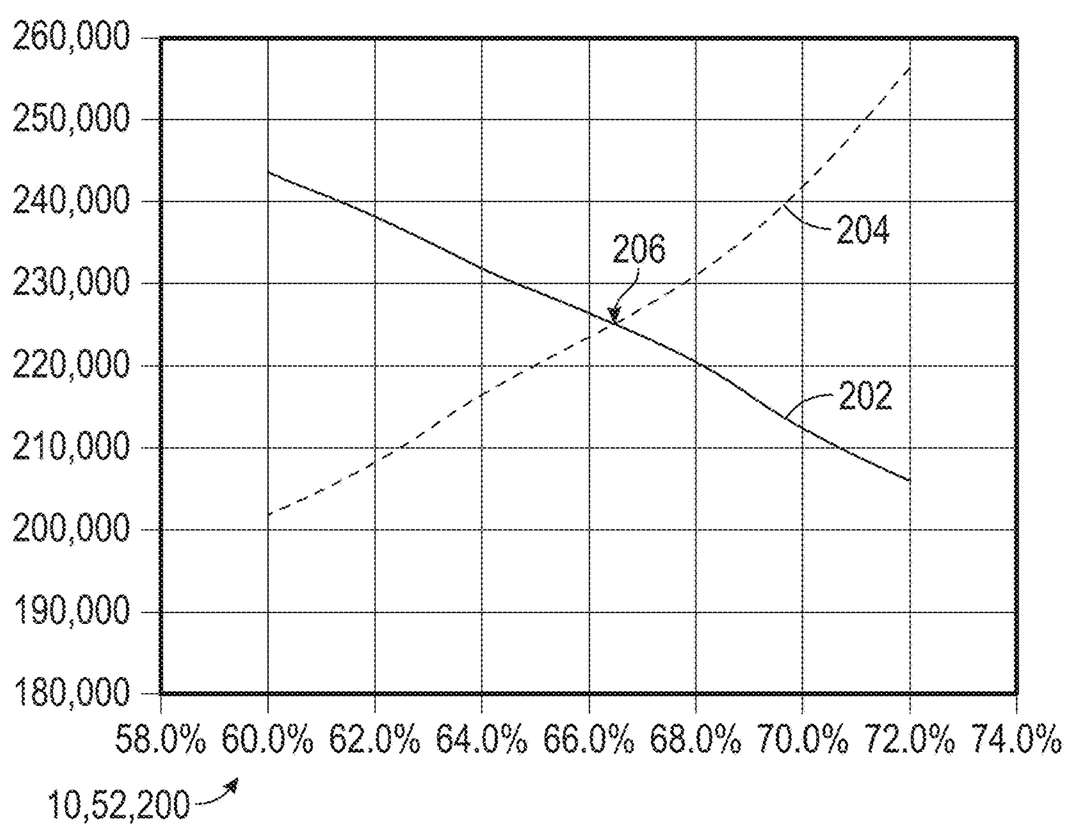
FIG. 3 is a chart depicting a sweep of front brake pad wear and rear brake pad wear versus brake force distribution in an off-line pad wear simulation of the brake force distribution application of FIG. 2 according to an exemplary embodiment.

Referring now to FIGS. 2 and 3 and with continuing reference to FIG. 1, a brake force distribution (BFD) application 52 of the system 10 is shown in further detail. Specifically, FIG. 2 depicts the BFD application 52 in flowchart form, depicting logical flow of the BFD application 52. The BFD application 52 is an application 50 stored in memory 46 and executed by the processor 44 of the controller 40 that adaptively adjusts braking system 62 control functions. More specifically, the BFD application 52 utilizes sensor 14 data, and vehicle operator 42 preference data to adjust a BFD profile of the host vehicle 12, while simultaneously providing vehicle operators 42 with the ability to adjust braking performance preferences, and thereby, performance of the host vehicle 12.

The BFD application 52 begins at block 100 where an off-line optimization is performed. It will be appreciated that maintaining even wear life of braking components provides optimal or maximal long-term wear and longevity for braking system 62 components, reduces a potential for braking system 62 malfunctions from a first level to a second level lower than the first, and reduces the potential for resulting vehicle operator 42 complaints, and the like. Accordingly, the off-line optimization at block 100 utilizes a detailed braking system 62 model, including predefined and adaptable front and rear brake thermal and cooling performance expectations, front and rear brake component (i.e. pad, shoe, disk, drum) wear characteristics, and road load losses such as tire rolling resistance, chassis and driveline frictional losses, and aerodynamic drag to optimize front to rear brake-force distribution. In additional aspects, the off-line optimization at block 100 further optimizes front-to-rear brake force distribution to achieve even wear life over a target use schedule, such as a worldwide light vehicle harmonized test procedure (WLTP), or the like. In additional non-limiting examples shown in FIG. 3, a chart 200 depicting a sweep of front brake pad wear 202 and rear brake pad 204 wear versus BFD conducted by off-line pad wear simulations resulting in an optimized or idealized point 206 where curves of rear pad wear and front pad wear cross. The idealized or optimized point 206 is used as an initial calibration within the BFD application 52. The idealized or optimized point 206 is selected to respect safety and drivability boundaries.

Referring once more to FIG. 2 and with continuing reference to FIGS. 1 and 3, at block 102, the BFD application 52 measures and/or computes brake pad wear in real-time. The brake pad wear may be measured directly or indirectly via sensors 18 of the vehicle 12, or through known use parameters (quantities and/or frequency of high-performance driving such as track days, quantity and/or frequency of highway-driving, and the like). In additional examples, the brake pad wear may be predicted and/or measured in real-time by on-board or off-board wear models, sensors 18 and the like at block 104.

At block 106, the BFD application 52 performs a brake pad wear check after a predetermined and/or adjustable calibrated mileage and/or over predefined and/or adjustable calibrated time intervals. That is, at regular (calibrated) intervals, pad wear at each of the brakes 82 is compared to determine at least the following: system average wear (e.g. an average of 4 brake corners in a 4-wheeled vehicle), and wear at each brake corner, normalized by average wear. Brakes 82 having values higher than one (1) indicate wear occurring at a rate faster than the average wear or wear rate, while values lower than 1 indicate wear occurring at a rate lower than the average wear or wear rate.

At block 108, the BFD application 52 also performs a wear imbalance diagnostic. When excessive wear imbalances are detected, i.e. normalized wear is greater than a calibratable threshold wear, then a diagnostic process is initialized to inform the vehicle 12 operator 42 of the excessive wear imbalance. The diagnostic process may include any of a variety of different functions, depending on the particular host vehicle 12 and application. However, it will be appreciated that the diagnostic process generally informs the vehicle operator 42 of a BFD issue or BFD status through visual, audible, and/or haptic feedback provided via a human-machine interface (HMI), such as an infotainment system, heads-up-display (HUD), stereo, or other such interface of the host vehicle 12. In additional non-limiting examples, the diagnostic process may forward information to a back-end server 86, to a repair shop, or the like, and/or may update the vehicle operator 42 via messages sent to a vehicle operator's 42 mobile device, email, or via direct mailings, thereby causing the vehicle operator 42 to initiate a service appointment to repair and/or replace brake system 62 components (i.e. pads, rotors, shoes, drums, and the like).

Subsequently at block 110, the BFD application 52 performs a mileage interval adjustment. When measured and/or computed brake component (i.e. pad, shoe, disk, and/or drum) wear rates are elevated above predetermined normal or standard wear rates, as in the case of a severe duty cycle of usage, the frequency of brake component (i.e. pad, shoe, disk and/or drum) wear checks and BFD trim adjustments is increased above a predetermined normal and/or standard wear check and/or BFD trim adjustment frequency, and a mileage interval between checks is decreased accordingly.

At block 112, the BFD application 52 enters BFD trim mode. Within the BFD trim mode, the BFD application 52 adaptively automatically trims to compensate for uneven brake component wear from side-to-side of the host vehicle 12 (i.e. from left to right) within predefined limits. The predefined limits may include both qualitative and quantitative limits based on avoiding a propensity for wheel 20 lock, front axle 88 and/or rear axle 90 locking, and/or legislation or standardized parameters, such as MVSS 105, MVSS 135, Region 2 balance, and ECR 13. In additional aspects, the predefined limits may include boundaries conditions, such as drivability considerations. For example, drivability considerations may include avoiding excessive yaw rates and/or path deviation during braking. When wear imbalances side-to-side and/or front-to rear are extreme, exceeding either qualitative or quantitative limits, the BFD application 52 alerts the driver and may also alert a backend server 86 or service provider as detailed above. While in normal road use, the system 10 and BFD trim mode of the BFD application 52 are bounded by the predefined limits described above, it should be appreciated that under certain off-road circumstances, a vehicle operator 42 may desire to alter BFD beyond the predefined limits.

In additional non-limiting examples, at block 112, the BFD application 52 receives information from the braking system 62 sensors 14 indicating that the host vehicle 12 brakes 82 are running significantly hotter on a front axle 88 than on the rear axle 90. When brakes 82 operate at high temperatures, increased brake 82 wear may be expected. Based on materials, component parts, and the like, in one non-limiting example, brakes 82 on the front axle 88 may run hotter than on the rear axle 90, and up to three times (3×) linear brake pad wear may be expected on the brakes 82 of the front axle 88 versus the brakes 82 of the rear axle 90. A first brake 82 service to replace wear items may be expected at, for example, 36,000 kilometers without intervention of the BFD application 52. Since the BFD application 52 adaptively adjusts brake force distribution between brakes 82 of the front and rear axles 88, 90, brake 82 wear may be substantially reduced from a first level to a second level substantially lower than the first, and the service interval may be delayed accordingly. For example, rather than having a 36,000 kilometer interval, the BFD application 52 may provide for a service interval of up to 58,000 kilometers, or more. By delaying brake 82 services through adaptively adjusting BFD with the BFD application 52, brake 82 components may have longer service life, and thereby reducing servicing requirements, costs, and improving customer satisfaction while maintaining and/or improving host vehicle 12 braking performance.

In some non-limiting examples, at block 114, the vehicle operator 42 may manually tune the BFD of the host vehicle 12. Manual tuning allows the vehicle operator 42 to adjust BFD so that the host vehicle 12 performs dynamically in a desired manner under certain predetermined conditions. That is, a vehicle operator 42 may desire to alter BFD beyond the predefined limits to increase host vehicle 12 rotation during trail-braking during performance driving on a track, or during rally-style offroad driving, or the like. Accordingly, so long as the vehicle operator 42 confirms, acknowledges, and understands risks inherent with operating a host vehicle 12 where the BFD exceeds the predefined limits, for which the system 10 will prompt the vehicle operator 42, the host vehicle 12 may, at least temporarily, be manually caused to operate outside the bounds of the predefined BFD limits.

At block 116, the BFD application 52 auto-trims or automatically adjusts BFD front-to-rear and side-to-side of the host vehicle 12. More specifically, front-to-rear brake force distribution is "trimmed" by small calibratable amounts that are inversely proportional to the wear imbalance detected. The trim amount is supervised by calibratable limits to keep the BFD within predetermine "safe" bounds for the host vehicle 12. The boundaries of allowable trim are set to assure the host vehicle 12 remains within the symmetry requirements of, for example ECER13H, which maintains braking performance compliancy with global regulations such as FMVSS 105, FMVSS 135, ECER13 and R13H, as well as maintaining host vehicle 12 stability performance compliant with FMVSS 126. Boundaries may also be bounded by the drivability considerations and limits discussed above, namely: avoiding excessive yaw rates and/or path deviation during braking.

More specifically, at block 118, the BFD application 52 further auto-trims based on the reception of brake requests (i.e. deceleration) that exceed a calibrated threshold. Upon determining that a brake torque request exceeds a calibrated threshold, the brake torque request is blended at block 120 to an alternate control method suited to increased or higher deceleration levels. Blending the brake torque request may include returning to a baseline BFD, switching control with smoothed blending in between to an alternate method, such as temperature, traction distribution, or the like. However, when at block 118, the BFD application 52 determines that the brake torque request has not exceeded the calibrated threshold, the BFD application 52 proceeds to block 122 and trims BFD to compensate for potential brake 82 wear imbalances before returning to block 106 once more.

Referring once more to block 112, once the manual trim mode is initialized, the BFD application 52 proceeds to block 114 and subsequent block 124 where the vehicle operator 42 may request a static BFD or a dynamic trim of BFD in a manual trim mode. In the manual trim mode, the vehicle operator 42 may select "static" BFD, which does not change until the system 10 returns to an automatic trim mode, either by vehicle operator 42 selection or calibrated time or distance thresholds. In an alternate selection in the manual trim mode, the vehicle operator 42 may select a "dynamic" BFD which causes brake force distribution and/or balance to respond to steering inputs, thereby assisting the vehicle operator 42 in rotating the vehicle in dynamic driving conditions.

Figure 4:
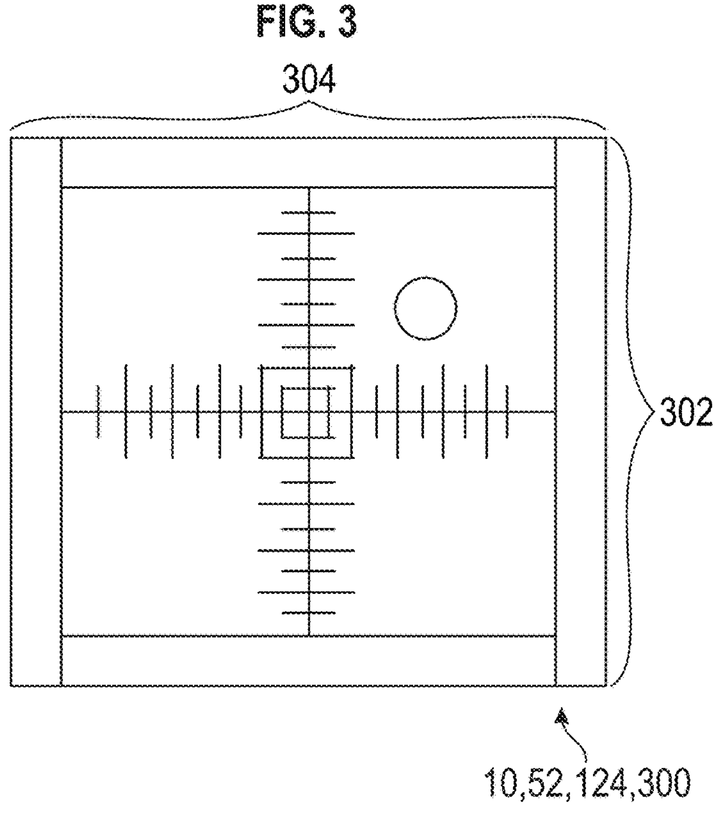
FIG. 4 is a depicting of an exemplary graphical user interface of a portion of the brake force distribution application of FIG. 2 according to an exemplary embodiment.

When the "static" BFD selection is made in the manual trim mode, the vehicle operator 42 is subsequently prompted at block 126 to make a manual BFD selection via one or more HMIs of the vehicle, such as a graphical user interface (GUI) 300. Referring now to FIG. 4 and with continuing reference to FIGS. 1-3, a non-limiting but exemplary GUI 300 for manual BFD selection is shown. The manual BFD selection 300 may include front-to-rear 302 and side-to-side 304 distribution selections which are supervised to remain within predefined boundary conditions as described previously. In non-limiting examples, the GUI 300 through which the manual BFD distribution selections are made may be displayed in a variety of different manners, including on-screen knobs, sliders, or the like.

To enter "dynamic" BFD within the manual trim mode at block 128, the vehicle operator 42 selects "dynamic trim" or similar within the HMI of the host vehicle 12. Upon selecting the "dynamic trim" function of the BFD application 52 manual mode, the system 10 allows a gain to be selected. The gain changes side-to-side BFD according to current steering control directions as obtained from a steering wheel angle sensor (SAS) or other such steering position sensors 32. Trim is again limited to remain within the predefined boundary conditions. The predefined boundary conditions or limits may be tied to host vehicle 12 operation modes intended for predetermined specific use cases, such as "Race Track" (e.g. allowing a more aggressive bias in one direction to work on an oval racetrack), "Off Road/Military" (allowing for up to 100% left or right bias a very low speeds to enable simplified host vehicle 12 turning), and "Service/Diagnostic" (e.g. allowing performance issues in brakes 82 or interfacing systems to be isolated by axle, by side, or by individual or several corners of the host vehicle 12 (i.e. front left corner, front right corner, rear left corner, and/or rear right corner), or the like.

A system 10 for initializing and actively adjusting BFD to optimize brake 82 wear and performance of the present disclosure offers several advantages. These include using sensor 14 data, and vehicle operator 42 preference data to adjust a BFD profile of the host vehicle 12, while simultaneously providing vehicle operators 42 with the ability to adjust braking performance preferences, and thereby, performance of the host vehicle 12. More broadly, the system 10 of the present disclosure provides the ability to initialize and actively, dynamically, and automatically adjust brake force distribution to optimize brake 82 component wear and performance, dynamically adjust brake force distribution front-to-rear and side-to-side during vehicle operation, optimize brake 82 component wear for a vehicle operator's 42 usage pattern, and which provide for manual adjustment of brake force distribution based on host vehicle operator 42 preferences during certain driving conditions, while maintaining or decreasing system complexity, improving reliability, and improving system reliability and redundancy.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for initializing and actively adjusting brake force distribution (BFD) in a host vehicle, the system comprising:

a host vehicle;

one or more sensors integrated into the host vehicle, the one or more sensors detecting static and dynamic state information about the host vehicle;

one or more actuators integrated into the host vehicle, the one or more actuators altering the static and dynamic state of the host vehicle;

a controller having a processor, a memory, and input/output (I/O) ports, the I/O ports in communication with the one or more sensors and the one or more actuators, the processor executing program code portions stored in the memory, the program code portions including a brake force distribution (BFD) application comprising:

a first control logic for performing an off-line optimization of BFD;

a second control logic for computing real-time wear of brake components;

a third control logic for performing brake component wear checks;

a fourth control logic for performing a mileage interval adjustment of BFD based on real-time wear of the brake components and the off-line optimization of the BFD;

a fifth control logic for selectively engaging an auto-trim mode of the BFD application; and a sixth control logic for selectively engaging a manual trim mode of the BFD application, wherein the BFD application adjusts the BFD of the host vehicle to automatically compensate for brake wear imbalances front-to-rear and side-to-side of the host vehicle, thereby delaying brake service intervals, causing brake components to have a lengthened service life, and maintaining and improving host vehicle braking performance.

2. The system of claim 1, wherein the first control logic further comprises:

control logic that determines an optimized or idealized BFD for the host vehicle, wherein the optimized or idealized BFD defines an initial calibration for BFD across the one or more actuators of a braking system of the host vehicle, wherein the optimized or idealized BFD respects predetermined boundaries, including predetermined drivability boundaries and predetermined test procedures.

3. The system of claim 2, wherein the second control logic further comprises:

control logic for obtaining, from the one or more sensors, brake component wear information; and control logic for modeling brake component wear though a detailed model of the braking system, including predefined and adaptable front and rear brake thermal cooling performance expectations, front and rear brake component wear characteristics, and road load losses.

4. The system of claim 3, wherein the third control logic further comprises:

control logic for performing brake component wear checks based on calibrated time intervals and calibrated host vehicle mileage, wherein:

the calibrated time intervals further comprise at least one of a predetermined time interval and an adjustable time interval; and wherein:

the calibrated mileage intervals further comprise at least one of a predetermined host vehicle mileage interval and an adjustable host vehicle mileage interval.

5. The system of claim 4, wherein the third control logic further comprises:

control logic for detecting a brake component wear imbalance, including comparing a normalized wear to a calibratable threshold wear, and upon determining that the normalized wear is greater than the calibratable threshold wear, initializing a diagnostic process that informs a host vehicle operator of the brake component wear imbalance through one or more of a visual, audible, and haptic feedback presented through a human-machine interface (HMI) of the host vehicle.

6. The system of claim 5, wherein the fourth control logic further comprises:

control logic for determining that measured or computed brake component wear rates indicate a severe duty cycle of usage, and that brake component wear rates are elevated above predetermined normal or standard wear rates; and control logic that increases a frequency of brake component wear checks above a predetermined frequency of brake component wear checks; and control logic that increases a frequency of BFD trim adjustments above a predetermined frequency of BFD trim adjustments.

7. The system of claim 6, wherein the fifth control logic further comprises:

control logic that, within the auto-trim mode, determines that a brake request is below a calibrated threshold, and upon determining that the brake request is below the calibrated threshold, trims BFD to compensate for wear imbalances; and upon determining that the brake request is not below the calibrated threshold, blends BFD back to a baseline BFD.

8. The system of claim 7, wherein the sixth control logic further comprises:

control logic that, within the manual trim mode, prompts the vehicle operator to make a manual BFD selection via one or more HMIs of the vehicle, including:

manually selecting a front-to-rear BFD; and manually selecting a side-to-side BFD, wherein each of the front-to-rear and side-to-side BFDs are bounded by predefined drivability limits, avoid excessive yaw rates, and avoid path deviations during braking.

9. The system of claim 8, wherein the sixth control logic further comprises:

control logic that, within the manual trim mode, prompts the vehicle operator to select from at least a static BFD and a dynamic BFD.

10. The system of claim 9, wherein the static BFD further comprises:

control logic that, in the static BFD, causes the vehicle operator to select, within the HMI, a static BFD, including a static front-to-rear BFD and a static side-to-side BFD; and control logic that, in the dynamic BFD, causes the vehicle operator to select, within the HMI, a gain, wherein the gain changes side-to-side BFD according to current host vehicle steering control directions; and control logic that in either the static BFD or the dynamic BFD, causes the BFD to remain within predefined boundary conditions tied to at least one of: predetermined host vehicle use cases including race track, off road, and service/diagnostic uses.

11. A method for initializing and actively adjusting brake force distribution (BFD) in a host vehicle, the method comprising:

detecting static and dynamic state information about the host vehicle with one or more sensors integrated into the host vehicle;

altering the static and dynamic state of the host vehicle with one or more actuators integrated into the host vehicle;

executing, with a processor of a controller, program code portion stored in memory of the controller, the controller further having one or more input/output (I/O) ports in communication with the one or more sensors and the one or more actuators, the program code portions including a brake force distribution (BFD) application comprising control logic for:

performing an off-line optimization of BFD;

computing real-time wear of brake components;

performing brake component wear checks;

performing a mileage interval adjustment of BFD based on the real-time wear of brake components and the off-line optimization of the BFD;

selectively engaging an auto-trim mode of the BFD application; and selectively engaging a manual trim mode of the BFD application; and adjusting the BFD of the host vehicle to automatically compensate for brake wear imbalances front-to-rear and side-to-side of the host vehicle, thereby delaying brake service intervals, causing brake components to have a lengthened service life, and maintaining and improving host vehicle braking performance.

12. The method of claim 11, further comprising:

determining an optimized or idealized BFD for the host vehicle, wherein the optimized or idealized BFD defines an initial calibration for BFD across the one or more actuators of a braking system of the host vehicle, wherein the optimized or idealized BFD respects predetermined boundaries, including predetermined drivability boundaries and predetermined test procedures.

13. The method of claim 12, further comprising:

obtaining, from the one or more sensors, brake component wear information; and modeling brake component wear though a detailed model of the braking system, including predefined and adaptable front and rear brake thermal cooling performance expectations, front and rear brake component wear characteristics, and road load losses.

14. The method of claim 13, further comprising:

performing brake component wear checks based on calibrated time intervals and calibrated host vehicle mileage, wherein:

the calibrated time intervals further comprise at least one of a predetermined time interval and an adjustable time interval; and wherein:

the calibrated mileage intervals further comprise at least one of a predetermined host vehicle mileage interval and an adjustable host vehicle mileage interval.

15. The method of claim 14, further comprising:

detecting a brake component wear imbalance, including comparing a normalized wear to a calibratable threshold wear, and upon determining that the normalized wear is greater than the calibratable threshold wear, initializing a diagnostic process that informs a host vehicle operator of the brake component wear imbalance through one or more of a visual, audible, and haptic feedback presented through a human-machine interface (HMI) of the host vehicle.

16. The method of claim 15, further comprising:

determining that measured or computed brake component wear rates indicate a severe duty cycle of usage, and that brake component wear rates are elevated above predetermined normal or standard wear rates; and increasing a frequency of brake component wear checks above a predetermined frequency of brake component wear checks; and increasing a frequency of BFD trim adjustments above a predetermined frequency of BFD trim adjustments.

17. The method of claim 16, further comprising:

determining, within the auto-trim mode, that a brake request is below a calibrated threshold, and upon determining that the brake request is below the calibrated threshold, trimming the BFD to compensate for wear imbalances; and upon determining that the brake request is not below the calibrated threshold, blends BFD back to a baseline BFD.

18. The method of claim 17, further comprising:

prompting, within the manual trim mode, the vehicle operator to make a manual BFD selection via one or more HMIs of the vehicle, including:

manually selecting a front-to-rear BFD; and manually selecting a side-to-side BFD, wherein each of the front-to-rear and side-to-side BFDs are bounded by predefined drivability limits, avoid excessive yaw rates, and avoid path deviations during braking.

19. The method of claim 18, further comprising:

prompting, within the manual trim mode, the vehicle operator to select from at least a static BFD and a dynamic BFD;

causing, in the static BFD, the vehicle operator to select a static BFD, including a static front-to-rear BFD and a static side-to-side BFD;

causing, in the dynamic BFD, the vehicle operator to select a gain, wherein the gain changes side-to-side BFD according to current host vehicle steering control directions; and causing, in either the static BFD or the dynamic BFD, the BFD to remain within predefined boundary conditions tied to at least one of: predetermined host vehicle use cases including race track, off road, and service/diagnostic uses.

20. A method for initializing and actively adjusting brake force distribution (BFD) in a host vehicle, the method comprising:

detecting static and dynamic state information about the host vehicle with one or more sensors integrated into the host vehicle, the one or more sensors;

altering the static and dynamic state of the host vehicle with one or more actuators integrated into the host vehicle;

executing, with a processor of a controller, program code portion stored in memory of the controller, the controller further having one or more input/output (I/O) ports in communication with the one or more sensors and the one or more actuators, the program code portions including a brake force distribution (BFD) application comprising control logic for:

performing an off-line optimization of BFD, including:

determining an optimized or idealized BFD for the host vehicle, wherein the optimized or idealized BFD defines an initial calibration for BFD across the one or more actuators of a braking system of the host vehicle, wherein the optimized or idealized BFD respects predetermined boundaries, including predetermined drivability boundaries and predetermined test procedures;

computing real-time wear of brake components, including:

obtaining, from the one or more sensors, brake component wear information; and modeling brake component wear though a detailed model of the braking system, including predefined and adaptable front and rear brake thermal cooling performance expectations, front and rear brake component wear characteristics, and road load losses;

performing brake component wear checks, including:

performing brake component wear checks based on calibrated time intervals and calibrated host vehicle mileage, wherein:

the calibrated time intervals further comprise at least one of a predetermined time interval and an adjustable time interval; and wherein:

the calibrated mileage intervals further comprise at least one of a predetermined host vehicle mileage interval and an adjustable host vehicle mileage interval;

detecting a brake component wear imbalance, including comparing a normalized wear to a calibratable threshold wear, and upon determining that the normalized wear is greater than the calibratable threshold wear, initializing a diagnostic process that informs a host vehicle operator of the brake component wear imbalance through one or more of a visual, audible, and haptic feedback presented through a human-machine interface (HMI) of the host vehicle;

performing a mileage interval adjustment of BFD, including:

determining that measured or computed brake component wear rates indicate a severe duty cycle of usage, and that brake component wear rates are elevated above predetermined normal or standard wear rates; and increasing a frequency of brake component wear checks above a predetermined frequency of brake component wear checks; and increasing a frequency of BFD trim adjustments above a predetermined frequency of BFD trim adjustments;

selectively engaging an auto-trim mode of the BFD application, including:

determining, within the auto-trim mode, that a brake request is below a calibrated threshold, and upon determining that the brake request is below the calibrated threshold, trimming the BFD to compensate for wear imbalances; and upon determining that the brake request is not below the calibrated threshold, blends BFD back to a baseline BFD; and selectively engaging a manual trim mode of the BFD application, including:

prompting, within the manual trim mode, the vehicle operator to make a manual BFD selection via one or more HMIs of the vehicle, including:

manually selecting a front-to-rear BFD; and manually selecting a side-to-side BFD, wherein each of the front-to-rear and side-to-side BFDs are bounded by predefined drivability limits, avoid excessive yaw rates, and avoid path deviations during braking;

prompting, within the manual trim mode, the vehicle operator to select from at least a static BFD and a dynamic BFD;

causing, in the static BFD, the vehicle operator to select a static BFD, including a static front-to-rear BFD and a static side-to-side BFD;

causing, in the dynamic BFD, the vehicle operator to select a gain, wherein the gain changes side-to-side BFD according to current host vehicle steering control directions; and causing, in either the static BFD or the dynamic BFD, the BFD to remain within predefined boundary conditions tied to at least one of:

predetermined host vehicle use cases including race track, off road, and service/diagnostic uses; and adjusting the BFD of the host vehicle to automatically compensate for brake wear imbalances front-to-rear and side-to-side of the host vehicle, thereby delaying brake service intervals, causing brake components to have a lengthened service life, and maintaining and improving host vehicle braking performance.

* * * * *